US008891765B1

(12) United States Patent
Dorwin

(10) Patent No.: US 8,891,765 B1
(45) Date of Patent: Nov. 18, 2014

(54) METHOD, MANUFACTURE, AND APPARATUS FOR CONTENT DECRYPTION MODULE

(71) Applicant: Google Inc., Mountain View, CA (US)

(72) Inventor: David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/710,940

(22) Filed: Dec. 11, 2012

Related U.S. Application Data

(60) Provisional application No. 61/569,755, filed on Dec. 12, 2011.

(51) Int. Cl.
*H04N 7/167* (2011.01)
*G06F 21/10* (2013.01)

(52) U.S. Cl.
CPC ...................................... *G06F 21/10* (2013.01)
USPC .......................................... 380/201; 713/156

(58) Field of Classification Search
CPC ............ G06F 11/3672; G11B 20/0021; G11B 20/00086
USPC .......................................... 380/201; 713/156
See application file for complete search history.

(56) References Cited

U.S. PATENT DOCUMENTS

| 4,535,355 | A | 8/1985 | Arn et al. |
|---|---|---|---|
| 4,694,489 | A | 9/1987 | Frederiksen |
| 5,067,035 | A | 11/1991 | Kudelski et al. |
| 5,134,656 | A | 7/1992 | Kudelski |
| 5,144,663 | A | 9/1992 | Kudelski et al. |
| 5,191,611 | A | 3/1993 | Lang |
| 5,339,413 | A | 8/1994 | Koval et al. |
| 5,375,168 | A | 12/1994 | Kudelski |
| 5,392,351 | A | 2/1995 | Hasebe et al. |
| 5,487,167 | A | 1/1996 | Dinallo et al. |

(Continued)

FOREIGN PATENT DOCUMENTS

| EP | 0658054 A2 | 6/1995 |
|---|---|---|
| EP | 0714204 A2 | 5/1996 |

(Continued)

OTHER PUBLICATIONS

"A new approach to browser security: the Google Chrome Sandbox," Chromium Blog, http://blog.chromium.org/2008/10/new-approach-to-browser-security-google.html, 5 pages, Oct. 2, 2008.

(Continued)

*Primary Examiner* — Saleh Najjar
*Assistant Examiner* — Oleg Korsak
(74) *Attorney, Agent, or Firm* — Fenwick & West LLP

(57) ABSTRACT

A method, apparatus, and manufacture for a content decryption module (CDM) is provided. A user agent loads a web application. The web application gets a license for encrypted media content. The web application instructs a media stack of the user agent to play the encrypted media content. The license is sent from the web application to the media stack. Next, the license is sent from the media stack to the CDM. The media stack and the CDM are distinct binaries from each other. Encrypted data is sent from the media stack to the CDM. The encrypted data includes at least a portion of the encrypted media content. Next, the CDM provides decrypted data by decrypting the encrypted data.

20 Claims, 7 Drawing Sheets

(56) References Cited

U.S. PATENT DOCUMENTS

| | | |
|---|---|---|
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,640,435 B2 | 12/2009 | Morten |
| 7,805,616 B1 * | 9/2010 | Mohammed et al. ......... 713/189 |
| 7,817,608 B2 | 10/2010 | Rassool et al. |
| 7,953,882 B2 | 5/2011 | Shukla et al. |
| 8,560,642 B2 * | 10/2013 | Pantos et al. .................. 709/219 |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2003/0007568 A1 | 1/2003 | Hamery et al. |
| 2003/0046568 A1 | 3/2003 | Riddick et al. |
| 2004/0031856 A1 | 2/2004 | Atsmon et al. |
| 2004/0117500 A1 | 6/2004 | Lindholm et al. |
| 2004/0151315 A1 | 8/2004 | Kim |
| 2004/0184616 A1 | 9/2004 | Morten |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2006/0020811 A1 | 1/2006 | Tan |
| 2006/0212363 A1 * | 9/2006 | Peinado et al. .................. 705/26 |
| 2006/0280150 A1 | 12/2006 | Jha et al. |
| 2007/0160208 A1 | 7/2007 | MacLean et al. |
| 2007/0209005 A1 | 9/2007 | Shaver et al. |
| 2007/0219917 A1 | 9/2007 | Liu et al. |
| 2007/0294170 A1 | 12/2007 | Vantalon et al. |
| 2008/0027871 A1 | 1/2008 | Seo |
| 2008/0147671 A1 | 6/2008 | Simon et al. |
| 2008/0155673 A1 | 6/2008 | Jung et al. |
| 2008/0313264 A1 | 12/2008 | Pestoni |
| 2009/0007198 A1 | 1/2009 | Lavender et al. |
| 2009/0031408 A1 | 1/2009 | Thom et al. |
| 2009/0044008 A1 | 2/2009 | Lim |
| 2009/0183001 A1 * | 7/2009 | Lu et al. ......................... 713/168 |
| 2009/0208016 A1 | 8/2009 | Choi et al. |
| 2009/0249426 A1 | 10/2009 | Aoki et al. |
| 2010/0023760 A1 | 1/2010 | Lee et al. |
| 2010/0027974 A1 | 2/2010 | Ansari |
| 2010/0145794 A1 | 6/2010 | Barger et al. |
| 2010/0180289 A1 | 7/2010 | Barsook et al. |
| 2010/0211776 A1 | 8/2010 | Gunaseelan et al. |
| 2010/0242097 A1 | 9/2010 | Hotes et al. |
| 2010/0250532 A1 * | 9/2010 | Soroushian et al. ......... 707/736 |
| 2010/0299701 A1 | 11/2010 | Liu et al. |
| 2011/0179283 A1 | 7/2011 | Thom et al. |
| 2011/0225417 A1 | 9/2011 | Maharajh et al. |
| 2011/0314284 A1 | 12/2011 | Chou |
| 2012/0066494 A1 | 3/2012 | Lee et al. |
| 2012/0117183 A1 | 5/2012 | Wong et al. |
| 2012/0173884 A1 | 7/2012 | Patil |
| 2012/0317414 A1 | 12/2012 | Glover |
| 2012/0331293 A1 | 12/2012 | Ma et al. |
| 2013/0072126 A1 | 3/2013 | Topaltzas et al. |
| 2013/0097302 A9 | 4/2013 | Khedouri et al. |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |

(56) References Cited

FOREIGN PATENT DOCUMENTS

| | | | |
|---|---|---|---|
| JP | 03203432 A | 9/1991 | |
| JP | 08335040 A | 12/1996 | |
| JP | 10336128 A | 12/1998 | |
| JP | 11175475 A | 7/1999 | |
| JP | 2000022680 A | 1/2000 | |
| JP | 2000196585 A | 7/2000 | |
| JP | 2000293945 A | 10/2000 | |
| JP | 2001251599 A | 9/2001 | |
| WO | 96/06504 A1 | 2/1996 | |
| WO | 96/32702 A1 | 10/1996 | |
| WO | 99/21364 A1 | 4/1999 | |
| WO | 99/28842 A1 | 6/1999 | |
| WO | 99/30499 A1 | 6/1999 | |
| WO | 99/54453 A1 | 10/1999 | |
| WO | 01/35571 A1 | 5/2001 | |
| WO | 01/93212 A2 | 12/2001 | |
| WO | 02/21761 A2 | 3/2002 | |
| WO | 2004/002112 A1 | 12/2003 | |

OTHER PUBLICATIONS

"Conditional access," Wikipedia, the free encyclopedia, http://en.wikipedia.org/wiki/Conditional_access, 8 pages, created Jul. 7, 2005.
"Digital rights management," Wikipedia, the free encyclopedia, last modified Mar. 30, 2012, 30 pages http://en.wikipedia.org/w/index.php?title=Digital_rights_management&printable=yes.
"Encrypted Media Extensions, W3C Editor's Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.
"Establishing Interconnectivity among Various Makers' Products through Standardization of VOD Protocol", NTT Corporation Press Release, Sep. 27, 2002 http://www.ntt.co.jp/news/news02e/0209/020927.html.
"Getting Started: Background and Basics—The Chromium Projects," http://chromium.org/nativeclient/getting-started/getting-started-background-and-basics, 4 pages, Sep. 2, 2008.
"Google Native Client," Wikipedia, the free encyclopedia, http://en.wikipedia.org/wiki/Google_Native_Client, 6 pages, created Dec. 9, 2008.
"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes.
"HTML5," Wikipedia, the free encyclopedia, http://en.wikipedia.org/wiki/HTML5, 9 pages, created Nov. 16, 2006.
"Intelligent Systems for Finance and Business," Goonatilake, S. et al., eds., Chapters 2-10, 1995, pp. 31-173.
"Irdeto Access and Optibase create Strategic Alliance", Press Release, Irdeto Access, Dec. 14, 2000 pp. 1-4 http://www.irdetoaccess.com/press/0000041.htm.
"Irdeto Access and Optibase create Strategic Alliance", Press Release, Optibase, Dec. 14, 2000, pp. 1-2 http://www.optibase.com/html/news/December_14_2000.html.
"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.
"Media Source Extensions," http://html5-mediasource-api.googlecode.com/svn/trunk/draft-spec/mediasource-draft-spec.html, 1 page, Jul. 11, 2011.
"MediaSource Extensions v0.3," editor A. Colwell, http://html5-mediasource-api.googlecode.com/svn/tags/0.3/draft-spec/mediasource-draft-spec.html, 14 pages, Mar. 13, 2012.
"Multimedia over Coax Alliance," Wikipedia, the free encyclopedia, http://en.wikipedia.org/wiki/Multimedia_over_Coax_Alliance, 4 pages, created Jun. 11, 2006.
"PlayReady," Wikipedia, the free encyclopedia, last modified Jan. 30, 2012, 2 pages http://en.wikipedia.org/w/index.php?title=PlayReady&printable=yes.

"Sandbox—The Chromium Projects," http://dev.chromium.org/developers/design-documents/sandbox, 8 pages, Sep. 2, 2008.
"Scalable Video Coding," Wikipedia, the free encyclopedia, last modified Sep. 10, 2012, 4 pages http://en.wikipedia.org/w/index.php?title=Scalable_Video_Coding&printable=yes.
"UltraViolet (system)," Wikipedia, the free encyclopedia, last modified Feb. 20, 2012, 5 pages http://en.wikipedia.org/w/index.php?title=UltraViolet_(system)&printable=yes.
"W3C HTML Working Group," http://www.w3.org/html/wg, 9 pages, May 9, 2007.
"Web Cryptography Working Group Charter," W3C Technology and Society domain, http://www.w3.org/2011/11/webcryptography-charter.html, 6 pages, Apr. 3, 2012.
"What is HDCP (high definition copy protocol)?" Digital Connection, 2005, 2 pages http://www.digitalconnection.com/FAQ/HDTV_12.asp.
Balthrop, J. et al., "Coverage and Generalization in an Artificial Immune System", Proceedings of Genetic and Evolutionary Computation Conference (GECCO), Jul. 2002, pp. 1-8.
Barth, A. et al., "The Security Architecture of the Chromium Browser," Technical Report, Stanford University, 2008.
Blumenfeld, S. M., "Streaming Media—System Security," Broadcast Engineering Magazine, Oct. 2001, pp. 1-2.
Canadian Examiner Report for Application No. 2,559,323 mailed May 6, 2008, 3 pages.
Cheng, H. C. H., "Partial Encryption for Image and Video Communication", Department of Computing Science, University of Alberta, Fall 1998, pp. 1-87.
Cheng, H. et al., "Partial Encryption of Compressed Images and Videos", IEEE Transactions on Signal Processing, vol. 48, No. 8, Aug. 2000, pp. 2439-2451.
Deitcher, D., "Secure Implementations of Content Protection (DRM) Schemes on Consumer Electronic Devices," Discretix, White Paper, May 2011, 17 pages.
Eskicioglu, A. M. et al., "An Overview of Multimedia Content Protection in Consumer Electronics Devices", SP:IC, vol. 16 No. 7, Apr. 2001, pp. 681-699.
Ferrill, E. et al., "A Survey of Digital Watermarking", Feb. 25, 1999, 15 pages http://elizabeth.ferrill.com/papers/watermarking.pdf.
Forrest, S., "Research Projects," Dec. 2, 2003, pp. 1-3 http://www.cs.unm.edu/.about.forrest/projects.html.
Glazkov, D., "What the Heck is Shadow DOM?," http://glazkov.com/2011/01/14/what-the-heck-is-shadow-dom, 14 pages, Jan. 14, 2011.
Goodman, J. et al., "Low Power Scalable Encryption for Wireless Systems", Wireless Networks, No. 4, Jan. 1998, pp. 55-70.
Griwodz, C. et al., "Protecting VoD the Easier Way", ACM Multimedia, Bristol, UK, Jan. 1998, pp. 21-28.
Griwodz, C., "Video Protection by Partial Content Corruption", Multimedia and Security Workshop at ACM Multimedia, Bristol, UK, Sep. 1998, pp. 1-5.
Hunter, J., et al., "A Review of Video Streaming Over the Internet", DSTC Technical Report TR97-10, Aug. 1997, pp. 1-28.
International Search Report and Written Opinion for International Patent Application No. PCT/US07/62055 mailed Sep. 11, 2007.
Kirovski, D. et al, "Digital Rights Management for Digital Cinema", Proceedings of the SPIE, Bellingham, VA, vol. 4472, Jul. 31, 2001, p. 105-120.
Metz, C., "Google Native Client: The web of the future—or the past?" The Register, http://www.theregister.co.uk/2011/09/12/google_native_client_from_all_sides/print.html, 13 pages, Sep. 12, 2011.
Office Action for European Patent Application No. 05250968.4 mailed Jan. 26, 2006.
Official Communication for Chinese Patent Application No. 2004800071571 mailed Apr. 13, 2007.
Official Communication for European Patent Application No. 04757582.4 mailed May 22, 2007.
Omneon Video Networks Product Announcement, "Broadband Streaming—Omneon and BSkyB", TB-1006-1, 1998, pp. 1-4.
Schulzrinne, H., et al., "Real Time Streaming Protocol (RTSP)," RFC 2326, Apr. 1998, pp. 1-86.
Schulzrinne, H., et al., "RTP: A Transport Protocol for Real-Time Applications", RFC 1889, Jan. 1996, pp. 1-75.

(56) References Cited

OTHER PUBLICATIONS

Search Report for European Patent Application No. 05250968.4 mailed Oct. 12, 2005.
Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.
Supplementary European Search Report for European Patent Application No. 00986215 dated Nov. 14, 2005.
Official Communication for U.S. Appl. No. 13/586,664 mailed Dec. 26, 2013.
Official Communication for U.S. Appl. No. 13/437,789 mailed Mar. 26, 2013.
Official Communication for U.S. Appl. No. 13/586,664, mailed Jun. 20, 2013.
Official Communication for U.S. Appl. No. 13/437,789 mailed Aug. 14, 2013.
Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.
Official Communication for U.S. Appl. No. 13/437,789 mailed Nov. 13, 2013.
Official Communication for U.S. Appl. No. 13/532,734 mailed Oct. 23, 2013.
Official Communication for U.S. Appl. No. 13/654,237 mailed Oct. 23, 2013.
Official Communication for U.S. Appl. No. 13/654,271 mailed Oct. 24, 2013.
Official Communication for U.S. Appl. No. 13/712,764 mailed Nov. 7, 2013.
Supplementary European Search Report for European Patent Application No. 04757582.4 mailed Nov. 20, 2006.
Teixeira, L. M. et al, "Secure Transmission of MPEG Video Sources", Proceedings of IEEE Workshop on ISPACS, Nov. 6, 1998, pp. 1-5.
Wu, T.-L. et al., "Selective Encryption and Watermarking of MPEG Video (Extended Abstract)", submitted to International Conference on Image Science, Systems, and Technology, Feb. 17, 1997, 10 pages.
Yee, B. et al., "Native Client: A Sandbox for Portable, Untrusted x86 Native Code," IEEE Symposium on Security and Privacy, Oakland 2009, 15 pages, May 16-19, 2009.
Yoshida, K. et al., "A Continuous-Media Communication Method for Minimizing Playback Interruptions", IS&T/SPIE Conference on Visual Communications and Image Processing, San Jose, California, vol. 3653, Jan. 1999, 10 pages.
Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.

\* cited by examiner

US 8,891,765 B1

METHOD, MANUFACTURE, AND APPARATUS FOR CONTENT DECRYPTION MODULE

CROSS-REFERENCE TO RELATED APPLICATION

This application is a utility patent application based on previously filed U.S. Provisional Patent Application Ser. No. 61/569,755 filed on Dec. 12, 2011, the benefit of which is hereby claimed under 35 U.S.C. §119(e) and incorporated herein by reference.

TECHNICAL FIELD

The invention is related to computer software, and in particular, but not exclusively, to a method, manufacture, and apparatus for providing a content protection module (CDM) that is a distinct binary from a client browser where the CDM performs decryption for the client browser.

BACKGROUND

Today, HyperText Markup Language 5 (HTML5) media tags, such as <video> and <audio> tags are available to provide content providers with a simple way to deliver their audio and video content onto the web, and have it play on any web browser or browser-based device. The underlying functionality of the HTML media tags are referred to as HTML media elements. The <video> and <audio> tags enable an ecosystem where plugins are no longer required to play this content and end users have consistent access to it across their web-enabled devices. To date, content protection mechanisms to enable use of content that its owner wants to protect from unauthorized use are not supported in the context of HTML media tags.

BRIEF DESCRIPTION OF THE DRAWINGS

Non-limiting and non-exhaustive embodiments of the present invention are described with reference to the following drawings, in which.

DETAILED DESCRIPTION

Figure 1:
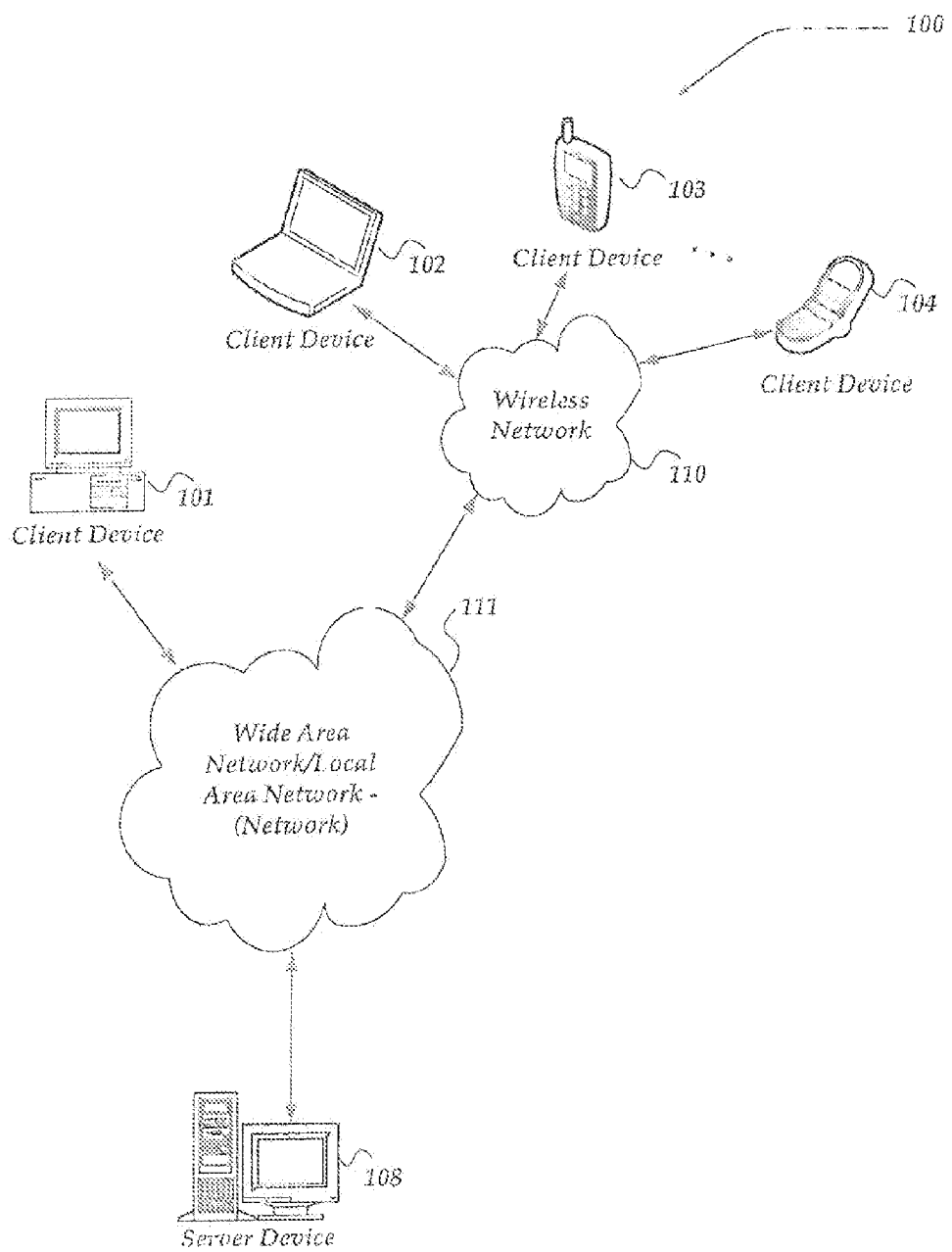
FIG. 1 illustrates a system diagram of one embodiment of an environment in which the embodiments of the invention may be practiced.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "signal" means at least one current, voltage, charge, temperature, data, or other signal.

Briefly stated, the invention is related to a method, apparatus, and manufacture for a content decryption module (CDM). A user agent loads a web application. The web application gets a license for encrypted media content. The web application instructs a media stack of the user agent to play the encrypted media content. The license is sent from the web application to the media stack. Next, the license is sent from the media stack to the CDM. The media stack and the CDM are distinct binaries from each other. Encrypted data is sent from the media stack to the CDM. The encrypted data includes at least a portion of the encrypted media content. Next, the CDM provides decrypted data by decrypting the encrypted data.

The acts discussed above do not proceed in the exact order discussed above in every embodiment. For example, in various embodiments the application instructing the media engine to initiate playback may happen before the application gets the license, may happen while the application sends the license to the media stack, or may happen after.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs") wide area networks ("WANs")-(network) 111, wireless network 110, client devices 101-104, and server device 108.

One embodiment of client devices 101-104 is described in more detail below in conjunction with FIG. 2. Generally, however, client devices 102-104 may include virtually any portable computing device capable of receiving and sending a message over a network, such as wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Wireless network 110 is configured to couple client devices 102-104 and its components with network 111. Wireless network 110 contains at least one Access Point (not shown in FIG. 1). Wireless network 110 may include any of a variety of wireless sub-networks that may further overlay stand-alone ad-hoc networks, and the like. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Network 111 is configured to couple network devices with other computing devices, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4. Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Server device 108 is a network device. Devices that may operate as server 108 include various network devices, including, but not limited to personal computers, desktop computers, multiprocessor systems, microprocessor-based or programmable consumer electronics, network PCs, server devices, network appliances, and the like. It should be noted that while various devices are shown in a particular quantity, for example, server 108 is shown as one device, in various embodiments there may a different quantity of such devices, such two or more servers. There may even be two or more separate networks of servers. Thus, the invention is not to be construed as being limited to a single environment and other configurations, and architectures are also envisaged.

Illustrative Client Device

Figure 2:
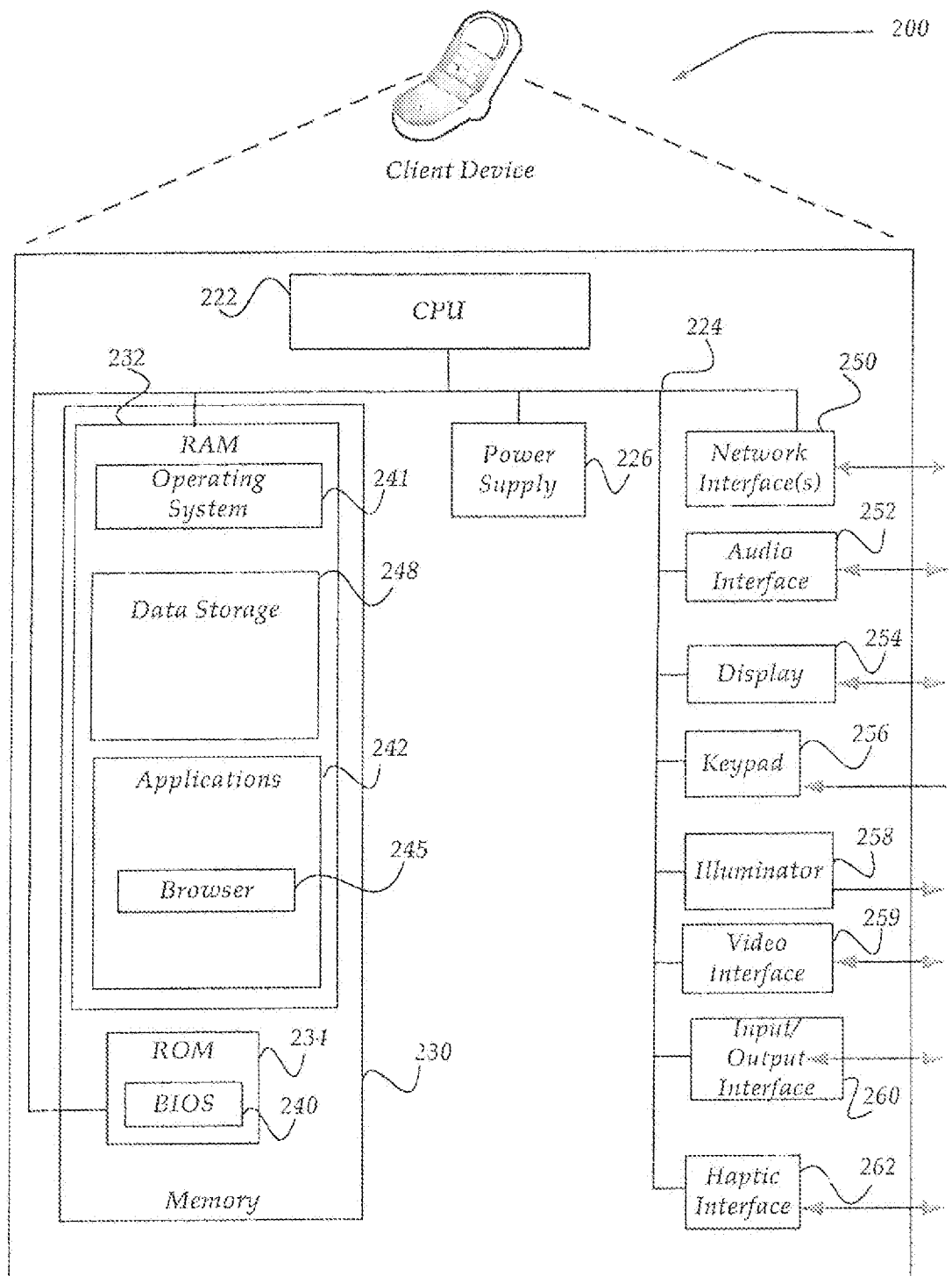
FIG. 2 shows one embodiment of a client device that may be included in the system of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1 (and, accordingly, may include virtually any type of client device).

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wired or wireless communication protocols, including WiFi, Ethernet, and/or the like. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobiler™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. Applications 242 may include computer executable instructions which, when executed by client device 200, perform actions. Other examples of application programs include calendars, search programs, email clients, IM applications, SMS applications, VoIP applications, contact managers, task managers, transcoders, database programs, word processing programs, security applications, spreadsheet programs, games, search programs, and so forth. In some embodiments, applications 242 may include a browser, a media stack for the browser, a content decryption module (CDM) for, inter alia, decrypting media content for the media stack, and an application running on the browser such as a web application.

Various embodiments of client device 200 may include applications 242 to perform various functions discussed herein and/or discussed with regard to some of the steps as illustrated in the flowcharts shown below. These stored applications are processor-executable code encoded on a processor-readable medium, which, when executed by CPU 222, enable actions to performed in accordance with the processor-executable code. In some embodiments, the applications 242 such as a web application for the browser, a media stack for the browser, and a CDM may perform steps such as those illustrated in the flowcharts below.

Although the discussion of various embodiments above has described the performance of actions implemented in software, for example by means of processor-executable code encoded on a processor-readable medium, which, when executed by CPU 222, enable actions to performed in accordance with the processor-executable code, in various embodiments, actions, may in some embodiments, rather than being performed only by executed software, may instead be performed based on hardware only, or by a combination of hardware and software.

Illustrative Network Device

Figure 3:
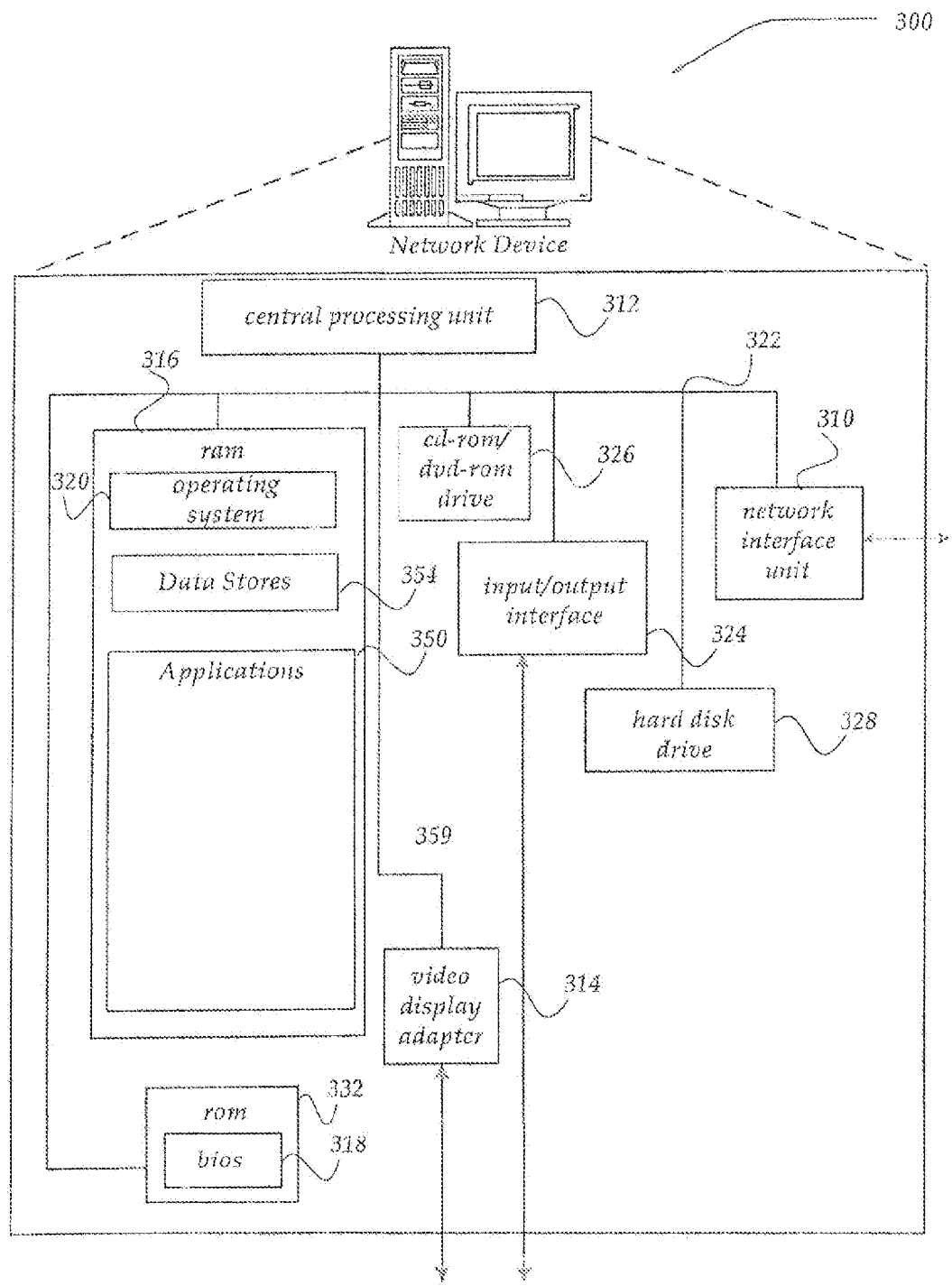
FIG. 3 illustrates one embodiment of a network device that may be included in the system of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, server 108 of FIG. 1.

Network device 300 may include processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory may store operating system 320 for controlling the operation of network device 300. Any general-purpose operating system may be employed. Basic input/output system ("BIOS") 318 may also be provided for controlling the low-level operation of network device 300. As illustrated in FIG. 3, network device 300 also can communicate with the Internet, or some other communications network, via network interface unit 310, which may be constructed for use with various communication protocols including the TCP/IP protocol. Network interface unit 310 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device. Data stores 354 may include a database, text, spreadsheet, folder, file, or the like.

Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 may be loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, authentication programs, security programs, SMS message servers, IM message servers, email servers, account managers, and so forth. In some embodiments, as discussed in greater detail below, application 350 may include applications for providing a content authorization service, and may provide a license to an authorized requesting client application.

Generalized Operation

The operation of certain aspects of the invention will now be described with respect to FIG. 4.

Figure 4:
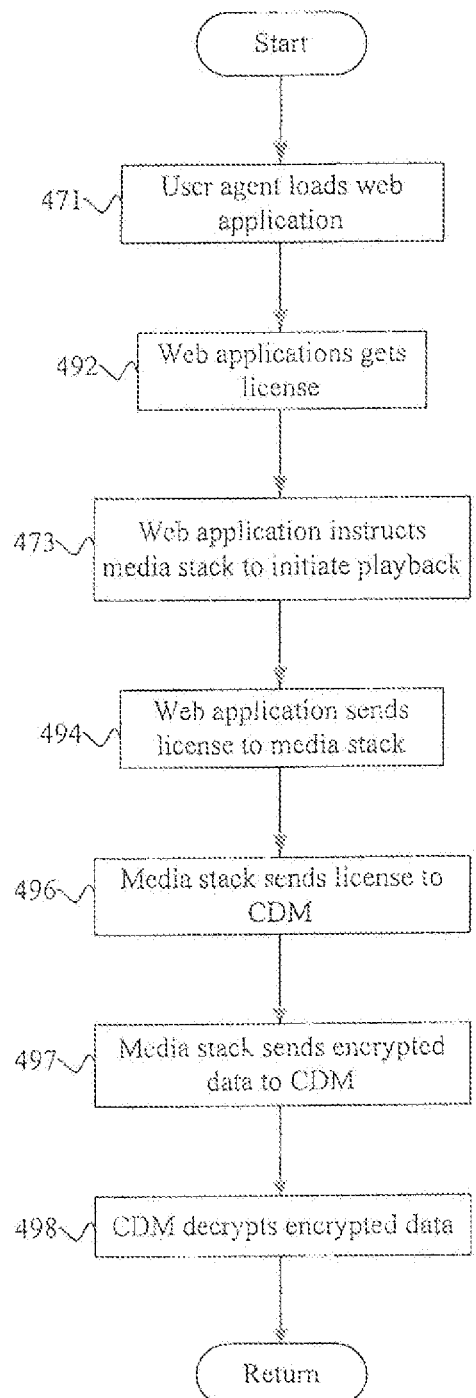
FIG. 4 shows a flowchart of an embodiment of a process.

FIG. 4 illustrates a flowchart of an embodiment of process 470. After a start block, the process proceeds to block 471, where a user agent loads a web application. The web application may include a scripting language (e.g., JavaScript) and HTML or a mark-up language derived from HTML (e.g., mark-up languages based on supersets/subsets/slices/extensions of HTML). In some embodiments, the user agent is a client web browser. In other embodiments, the user agent may be a user interface that is based upon HTML or a mark-up language derived from HTML, as discussed above. The process then moves to block 492, where the web application is employed to get a license for encrypted media content. The license may be acquired or retrieved in a variety of different ways in different embodiments. In some embodiments, a license is used to establish the content key in the media stack in content protection mechanisms where the key is not transmitted in the clear, and the key is extracted from or derived from the license data.

The process then advances to block 473, where the web application is employed to instruct a media stack of the user agent to play the encrypted media content. In some embodiments, the web application may contain an autoplay attribute, in which case the user agent parses the web application, discovers the autoplay attribute, and causes the media stack to autoplay the media content. In other embodiments, there is no autoplay attribute for the media content, and the web application instructs the media stack when to play media content. The media stack is instructed to play the media content in a time and manner that is in accordance with the web application. For example, in some embodiments, the web application instructs the media stack to play the media content when a "play" button is pressed by the user.

The process then moves to block 494, where the license is sent from the web application to the media stack. The process then proceeds to block 496, where the license is sent from the media stack to the CDM. The media stack and the CDM are distinct binaries from each other. The process then advances to block 497, where encrypted data is sent from the media stack to the CDM. The encrypted data includes at least a portion of the encrypted media content. The process then moves to block 498, where the CDM provides decrypted data by decrypting the encrypted data. The process then proceeds to a return block, where other processing is resumed.

What happens to the decrypted data varies in various embodiments. In some embodiments, the decrypted data is provided to the media stack for rendering. However, the invention is not so limited, and what happens to the decrypted data varies in different embodiments. For example, in some embodiments, the decrypted data is provided to a secure pipeline. These embodiments and others are within the scope and spirit of the invention.

The acts discussed above do not proceed in the exact order discussed above in every embodiment. In some embodiments, the acts may happen in the order shown. In some of these embodiments, the web application then gets the license at block 492, and then the web application instructs the media stack to initiate playback and send the license to the media stack (with block 473 and 494 happening in either order or at the same time).

In other embodiments, the act at block 473 may happen prior to the act at block 492. For example, in some embodiments, the web application instructs the media stack to initiate playback (block 473). The media stack may then discover that the media content is encrypted. The media stack then provides an indication to the web application that the media content is protected. In response, the web application gets the license at block 492. The web application then sends the license to the media stack at block 494. In some embodiments, the web application may determine without notification of encountering anything in the file that it needs a license, and may get the license at block 492 after determining that a license is needed.

The media stack performs and/or controls decoding of media content. In some embodiments, the media stack is a set of connected media processing and rendering modules used for converting digital media data into human-perceptible representations (e.g., moving pictures and/or sound). The media stack performs and/or controls functions such as de-multiplexing, decryption, and rendering in some embodiments. In some embodiments, the media stack has substantially no other logic, but just renders what it is fed, and can therefore be used for all types of media playback applications. Certain functions such as decryption are not performed directly by the media stack itself, but by the CDM, which is a separate module that performs certain functions, such as decryption, under the control of the media stack.

The web application instructs the media stack to play back media content. In some embodiments, the web application includes computer-executable code that implements substantially all logic required to play back media in a particular context, includes user interface logic, subtitle control information, control of the acquisition of content control data, and the like, but not processing and rendering. The processing, decryption, and rendering are instead performed by the media stack and/or by separate modules under the control of the media stack, including the CDM. In some embodiments, the rendering is performed by a part of the browser other than the media stack. In other embodiments, the rendering is performed by another part (hardware or software) of the client. Together, the media stack and the web application both reside in the client and operate as a client media player. The media stack and the web application are distinct programs or binaries or libraries or scripts, etc., where the media stack can be re-used. The media stack is part of an application framework, together with other modules that implement user input, graphics output, network I/O etc. The application framework exposes standard abstract interfaces for these functions to the web application.

This particular separation between media stack (as part of the application framework) and web application is useful because the media stack implementation is typically specific to the type of computer hardware platform it executes on, and therefore is implemented in a way that is strongly connected to the operating system. The same holds for user input, graphics output, network I/O, etc. In some embodiments, the media stack is specific to a particular type of content protection. The web application, however, can be the same across many different computer platforms when the underlying application framework abstracts access to user input, network, graphics, media stack etc.

A content encryption key may be generated employing any of a number of encryption/decryption symmetric mechanisms, including, but not limited to Advanced Encryption Standard (AES), RSA, RC6, IDEA, DES, RC2, RC5, Skipjack, and any other symmetric encryption algorithm. Moreover, such encryption algorithms may use, where appropriate, cipher block chaining mode, cipher feedback mode, CBC cipher text stealing (CTS), CFB, OFB, counter mode, and/or any other block mode. In some embodiments, content encryption keys are generated employing an at least 128-bit AES encryption/decryption algorithm. However, content encryption key generation is not limited to symmetric key mechanisms, and asymmetric key mechanisms may also be employed without departing from the scope of the present invention. Typically, where the content encryption key is a symmetric encryption key, such content encryption keys are also referred to as decryption keys, as the same key may be used to both encrypt and to decrypt the content.

At block 492, the web application may get the license in a number of different ways in different embodiments. In some embodiments, the web application gets the license via communication with a server. In some embodiments, the license may be found locally or on a local network. In some embodiments, the license is acquired in accordance with a digital right management (DRM) scheme, or other content protection system. In other embodiments, the license could be stored in the web application. The web application is configurable to different types of content protection through the same framework. The web application defines a protocol or process and standardizes the interfaces so that the process could be configured to work with any of a variety of like underlying sort of technologies, but the interface is the same regardless of the content protection system used.

At block 492, the web application may get the key in communication with a server or the like in some embodiments, but the license acquisition process is performed by the web application; the media stack is not involved in the license acquisition process at all, although the media stack and/or the CDM may well be involved in license exchange and processing, including the license request process.

Since the license acquisition occurs not in the media stack but in the web application, the web application has control over the error handling for the license acquisition, and the web application can handle error conditions and the like.

The process of acquiring a license can be accomplished multiple times during a single playback session, e.g., for key rotation.

In some embodiments, process 470 may be employed to play encrypted media content accessed via an HTML media element, in HTML5 or future versions of HTML that employ HTML media element tags such as <media>, <video>, <audio>, and future HTML, media elements.

In additional to decryption, in various embodiments, the CDM may also perform such functions as DRM, content protection, license exchange or processing (including e.g., license request generation), decoding, de-multiplexing, and/or the like. In some embodiments, the CDM performs decoding for codecs not supported by the browser. While the media stack generally performs rendering in many embodiments, in some embodiments, the CDM is employed to perform secure rendering.

In terms of DRM and/or content protection, in some embodiments, the CDM may protect the buffers and protect the decryption key through software methods. In some embodiments, the CDM has a secret key that the CDM uses to decrypt the license and obtain the content key, and the CDM protects the CDM's secret key. In some embodiments, the CDM employs the content key to decrypt the corresponding media. In some embodiments, the CDM must also protect the content key once the CDM has decrypted the content key from the license. In some embodiments, the CDM also protects the compressed, decrypted frames. In some embodiments, the memory is scrambled such that the decrypted but compressed frames are not available in memory at any time. In some embodiments, the decompressed frames may also be protected. In some embodiments, the CDM may also protect and/or enforce other license provisions, such as the length of time the license allows particular video content to be viewed. In some embodiments, the CDM determines when the license has expired, and that a new license is needed when the license has expired.

The media stack controls various functions of the CDM, such as when to decrypt and decode, when to render if the CDM performs rendering, when to generate a license request, and the like. However, in some embodiments, the CDM may also perform DRM and/or content protection functions that are not necessarily directly controlled or initiated by the media stack, such as those DRM and/or content protection functions discussed in the previous paragraph.

In some embodiments, the CDM performs decryption but not decoding. In some of these embodiments, the media stack may provide encrypted data to the CDM, the CDM decrypts the media and provides the decrypted media to the media stack, and the media stack then performs decoding on the decrypted media. In other embodiments, as previously discussed, the CDM performs both decryption and decoding. In some embodiments, after the media stack sends the CDM encrypted media, the CDM decrypts and decodes the encrypted media, and then sends the decrypted media to secure hardware (e.g., a secure surface) rather than returning the decrypted media to the media stack. In some embodiments, the CDM uses a secure pipeline for decryption, decoding, and/or rendering.

The CDM is a separate binary from the browser. This allows browsers to be provided that do not include decryption, DRM, license exchange, and/or content protection as part of the browser. Also, the browser may be entirely open source code, while having the decryption/DRM/content protection/license exchange/license request generation functions in a separate binary (the CDM) that is closed source code. The CDM may perform obfuscation not present in the open source browser. The CDM can use cryptography tricks that the browser does not have. It also allows a vendor to allow some solutions to be added "after market". As a separate binary, the CDM can be disabled by the user, isolated for security purposes, and/or isolated from the user's system for privacy purposes. Also, if the CDM crashes, the CDM crash may not crash the renderer or the browser processes.

In some embodiments, the CDM is a browser plug-in. In some embodiments, the CDM is a pluggable extension. In some embodiments, the CDM may employ "hooks" (i.e. to load a .DLL/.SO), extensions, and/or the like. In these embodiments, these application programming interfaces (APIs) may allow the media stack to use third-party and/or separately-downloaded module(s) (.so/.dll, COM interface/class, system-registered entity) to perform decryption, decoding, secure rendering, content protection, and/or other DRM capabilities. In some embodiments, the browser has extension interfaces, so that the code for the CDM can be registered to be called at certain times such as frame decryption.

In some embodiments, the CDM is sandboxed. In some embodiments, the CDM is sandboxed, but can perform particular unsandboxed operations via a special channel. In some embodiments, the CDM is sandboxed but can perform particular unsandboxed operations via a broker.

Content protection can involve accessing the system in ways web content usually should not need, which could lead to system vulnerabilities. If the CDM is sandboxed, these system vulnerabilities can be prevented. Also, sandboxing can provide privacy protection, so that the CDM cannot grab personal identifiable information or the like. By employing a sandboxed CDM that is a separate binary from the browser, secure decryption and/or DRM may be performed without polluting the browser or using platform capabilities; platform independent decryption/DRM may be performed both in the logical (OS-independent) and architecture/binary sense; and content protection, decryption, and/or the like can be separate from the browser and the web application, all while the browser handles playback.

Sandboxing only allows code execution that cannot make persistent changes to the computer, and sandboxed code execution cannot access information that is confidential. With sandboxing, code that is running cannot make changes to the system, and no matter what it does, does not have access to change the system. A sandboxed program typically cannot run commands that are not authorized, and might also be able to change the system, but only via strict APIs—the sandboxed code is unable create, modify, or delete a file using normal system calls. The sandboxed code can only change the system through an API, and the sandboxing entity can decide which kinds of accesses to allow.

In some embodiments, the CDM may be a sandboxed browser plug-in, and implemented as a Pepper/Pepper Plugin API (PPAPI) plug-in. Traditionally, plug-ins, including Pepper, are used to display content on the page. However, in some embodiments, Pepper is just used as a framework to execute code separate from the web browser within a sandbox.

In some embodiments, the CDM is not sandboxed, and the CDM can write out to a secure pipeline. In some embodiments, the CDM is not sandboxed, and it does decryption and decoding in a secure pipeline. (Secure pipelines may also be used when the CDM is sandboxed).

In other embodiments, the CDM may be a browser plug-in implemented, for example, in Netscape Plugin API (NPAPI) or ActiveX. In some embodiments, the CDM is a pluggable extension to the browser but is not a browser plug-in. In some embodiments, the CDM is an extension or a browser add-on. However, the plug-in need not be pluggable or extensible in all embodiments.

In some embodiments, the CDM is downloaded separately from the browser (e.g., in the background, when necessary, or when the user modifies a setting). In other embodiments, the CDM is present but disabled until the user takes some particular action.

In some embodiments, the browser may be loaded as an .exe file with the CDM loaded as a .dll file, such as CDM-.DLL, where the .exe and .dll files are required to be run together, and the browser can call CDM.DLL when needed. In some embodiments, the CDM.DLL file is sandboxed when it is loaded.

Figure 5:
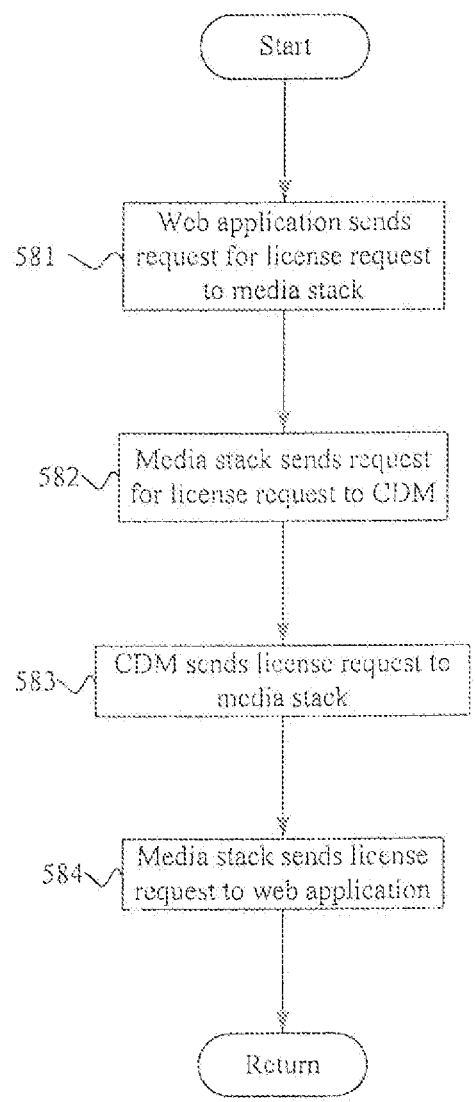
FIG. 5 illustrates a flowchart of an embodiment of a process that may be employed as part of the process of FIG. 4.

FIG. 5 illustrates a flowchart of an embodiment of process 580, which may be employed in conjunction with and/or as a part of process 470 of FIG. 4. For example, in some embodiments, process 480 may be employed in between block 471 and block 492 of process 470 of FIG. 4.

After a start block, the process proceeds to block 581, where the web application sends a request for a license request to the media stack. The process then moves to block 582, where the media stack sends the request for a license request to the CDM.

The process then advances to block 583, where the CDM sends a license request to the media stack. In some embodiments, the license request must come from the CDM, because, in these embodiments, for security purposes, the license server requires a signature that only the CDM can provide in order to provide the license. The process then proceeds to block 584, where the media stack sends the license request to the web application. The process then proceeds to a return block, where other processing is resumed.

Figure 6:
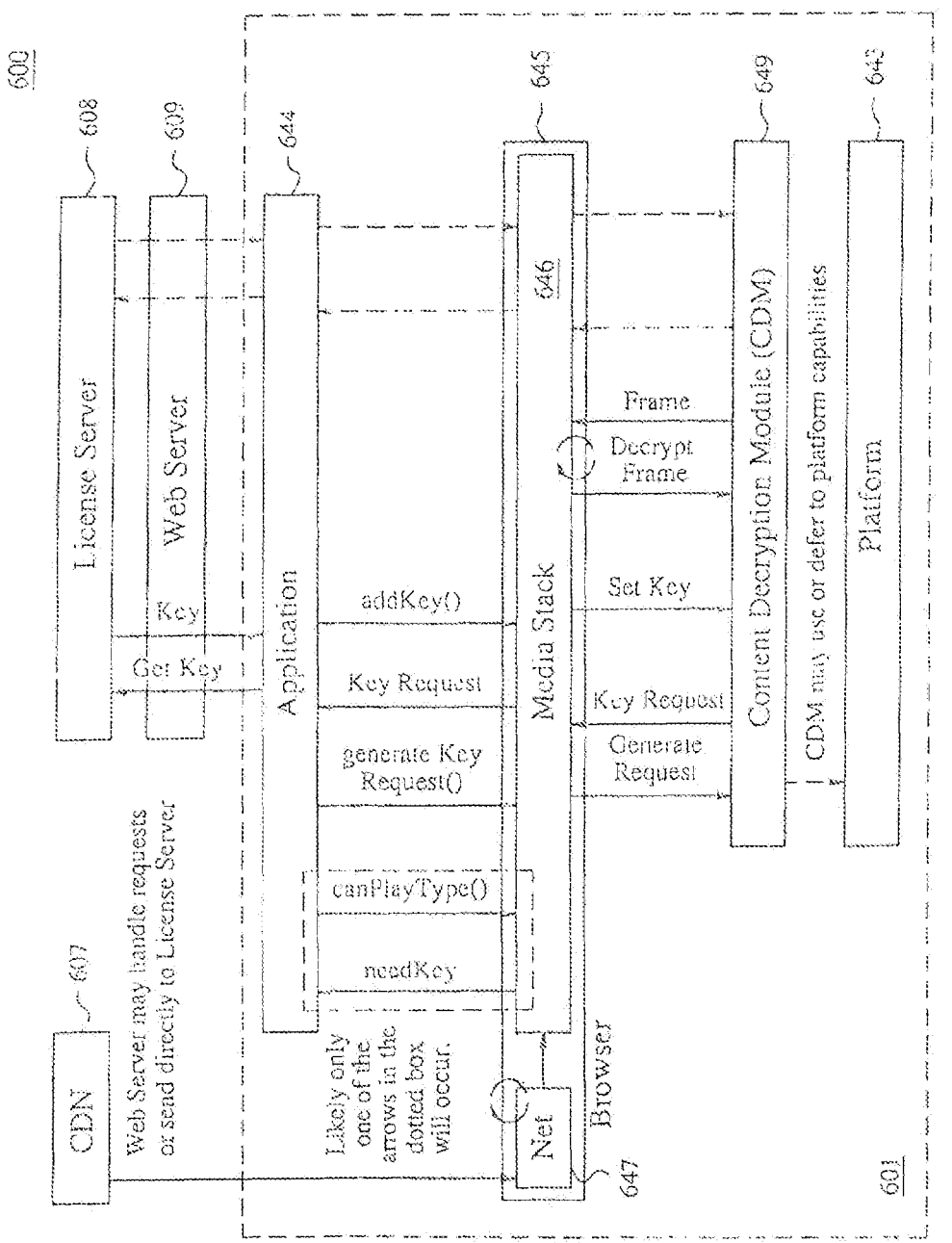
FIG. 6 shows a system that may be employed as an embodiment of the system of FIG. 1.

FIG. 6 shows system 600, which may be employed as an embodiment of system 100 of FIG. 1. System 600 includes license server 608, web server 609, content delivery network (CDN) 607, and client device 601. License server 608, web server 609, and CDN 607 may each, for example, be one or more server devices such as server device 108 of FIG. 1 and/or network device 300 of FIG. 3. Client device 601 may be, for example, an embodiment of client device 101-104 of FIG. 1 and/or client device 200 of FIG. 2.

Client device 601 includes application 644, content decryption module (CDM) 649, platform 643, and browser 645. Browser 645 includes media stack 646 and network stack (Net) 657.

CDM 649 performs decryption of media content in communication with media stack 646. Application 644 is a media playback control application, such as the web application discussed with regard to FIG. 4 above.

As discussed above, media stack 646 performs decoding of media content (in conjunction with CDM 649, which performs the actual decoding in some embodiments). In some embodiments, media stack 646 is a set of connected media processing and rendering modules used for converting digital media data into human-perceptible representations (e.g., moving pictures and/or sound). Media stack 646 performs functions such as de-multiplexing, decoding, and rendering in some embodiments (in conjunction with CDM 649 in some embodiments). In some embodiments, media stack 646 has substantially no other logic, but just renders what it is fed, and can therefore be used for all types of media playback applications in an interchangeable fashion.

Application 644 instructs media stack 646 to playback media content. In some embodiments, application 644 includes computer-executable code that implements substantially all of the logic required to play back media in a particular context, including user interface logic, subtitle control information, control of the acquisition of keys, and/or the like, but not processing and rendering. The processing and rendering is instead performed by media stack 646. In some embodiments, the rendering is performed by a part of browser 645 other than media stack 646. Together, media stack 646 and application 644 both reside in client device 601 and operate as a client media player. Media stack 646 and application 644 are distinct programs or binaries or libraries, etc., where media stack 646 can be re-used. As discussed above, application 644 may be a web application for playback of media using the HTML media elements identified in HTML5 by HTML media tags such as <media>, <video>, and <audio>, where the web application includes a scripting language (e.g., JavaScript) and HTML.

In some embodiments, when application 644 acquires a license, it does so in communication with one or more servers. In some embodiments, web server 608 may handle requests or send directly to license server 609. In some embodiments, application 644 may communicate directly with license server 609.

In some embodiments, media stack 646 may acquire media content specified by application 644 via network stack 647, where network stack 647 acquires the media content from CDN 607.

Figure 7:
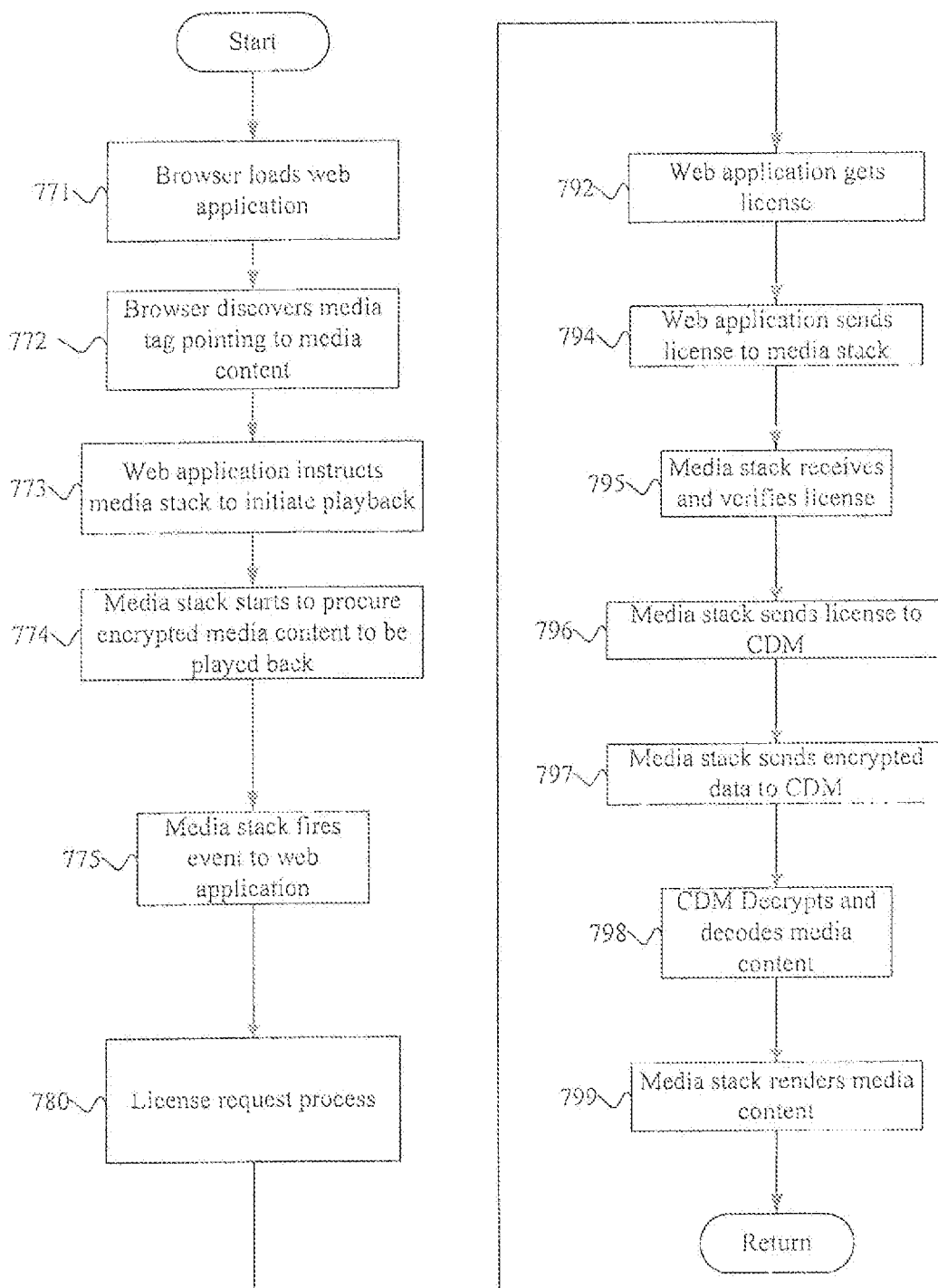
FIG. 7 illustrates a flowchart of an embodiment of the process of FIG. 4, in accordance with aspects of the invention.

FIG. 7 illustrates a flowchart of an embodiment of process 770, which may be employed as an embodiment of process 570 of FIG. 5. After a start block, the process proceeds to block 771, where the client browser loads the web application. The process then moves to block 772, where the client browser discovers an HTML media tag (e.g., <video> or <audio>) pointing to media content.

The process then advances to block 773, where the web application instructs the media stack of the client browser to initiate playback of the media content. The process then proceeds to block 774, where the media stack starts to procure the media content that the media stack was instructed to play back (e.g., through file reading, or progressive or adaptive streaming).

The process then advances to block 775, where the media stack fires an event to the web application, where the event indicates that a license is needed to begin or continue playback of the media content. The process then proceeds to block 780, where the license request process occurs. In one embodiment, the process at block 780 occurs substantially as process 580 of FIG. 5.

The process then moves to block 792, where the web application gets the license. As discussed in greater detail above and below, the web application may get the license in a variety of different ways in different embodiments. For example, in some embodiments, the application acquires the license via communication with one or more servers. In other embodiments, the license could be stored in the application. The process then advances to block 794, where the web application sends the license to the media stack or to hardware.

The process then proceeds to block 795, where the media stack receives the license. The process then advances to block 796, where the media stack sends the license to the CDM. The process then moves to block 797, where the media stack sends encrypted data to the CDM. The encrypted data may be accompanied by parameters, including which license the encrypted data is associated with. The process then proceeds to block 798, where the encrypted data is decrypted and decoded by the CDM. In some embodiments, the media content is first decrypted and then decoded, and in other embodiments, the media content is first decoded then decrypted. In some embodiments, the encrypted media content it sent from the media stack to the CDM one frame at a time, and the CDM decrypts and decodes the media content one frame at a time. In some embodiments, the CDM performs the decryption but not the decoding, and the decoding is instead performed by the media stack after the decrypted media is sent back to the media stack.

The process then advances to block 799, where the CDM sends the decrypted and decoded media content back to the media stack, and the media content is rendered by the media stack. In some embodiments, the media stack renders media content. In other embodiments, another part of the browser renders the media content. The processing then proceeds to a return block, where other processing is resumed.

Many variations to the exact process flow illustrated in FIG. 7 are within the scope and spirit of the invention. For example, in some embodiments, the web application may determine that the media is encrypted. Accordingly, rather than the web application instructing the media stack to initiate playback right away, in this case the web application can instead get the license, and after the web application gets the license, the web application can instruct the media stack to initiate playback along with sending the media stack the data that includes the license. In some embodiments, the media tags may specify that the media is encrypted. As previously discussed, the steps may happen in a different order than shown in FIG. 7, for example, the step of block 773 may occur earlier or later than shown, as previously discussed. Further, in some embodiments, the application may determine without notification that a license is needed, rather than having to encounter something in the file before determining that a license is needed.

In some embodiments, such as a key rotation scheme, the media stack can fire an event each time a new key is needed, and the application can provide the new key to the media stack.

Process 770 may be applied to local content, to content that is downloaded and then played, and/or to streaming content. Process 770 is not specific to any particular form of content protection, but may be applied to various forms of DRM and other forms of content protection in different embodiments. Process 770 can support a wide range of control system types, including traditional DRM systems, conditional access systems, simple key establishment without the need for DRM servers, and key distribution systems based on DRM systems.

In some embodiments, process 770 may be used for viewing commercial content, including commercial content protected by a content protection mechanism such as DRM, where the commercial content may include movies or the like. In some embodiments, the media may be accessed via a webpage employing HTML5, or a future version of HTML that also supports media tags, where the media content is accessed in an HTML media tag such as <video> or <audio>. The media content, which is protected by some sort of content protection, such as encryption, DRM, and/or the like, can be accessed in a browser with an HTML media tag, with the media accessible, controllable, and configurable by the web application, where the media content can be streamed to the browser, downloaded, provided by the application, or local. In some embodiments, the web application provides application level flexibility to implement the authorization exchange, and all of the HTML5 security mechanisms may be used for network transactions.

In some embodiments, one attribute (authorizationData) and one event (authorizationNeeded) is added to the HTML5 media elements, as follows. In some of these embodiments, the design adds one new attribute to media elements named authorizationData. In some embodiments, the purpose of this attribute is to provide the CDM with the necessary information to initialize itself and enable playback of the requested content (e.g., a decryption key). In some embodiments, authorizationData may be a method that provides the data to the media element. The attribute authorizationData and the event authorizationNeeded may have different names in different embodiments. For example, in FIG. 6, they are referred to as addKey( ) [as a called function rather than an attribute] and needkey, respectively.

The authorizationNeeded event fires when the media stack underneath the media element discovers the need for fresh authorization data to start or continue playback. This event is accompanied by one or more blobs of data generated by the media stack that is potentially opaque to the application. The format of the data may be dependent on the content control mechanism(s) in the CDM and/or content format.

The authorizationNeeded event is an embodiment of the event fired at block 775 of process 770. In some embodiments, the authorizationNeeded event also contains supplemental data that is specific to the content control mechanism and/or content. The supplemental data can be opaque to the application—it only needs to be understood by the entity that creates the license data, which could be a network service in some embodiments.

The web application uses the information mentioned above to procure the required content control data (either through an application-specific mechanism or through a content-control-specific mechanism). This could happen through in-client processing, querying (e.g. a password), retrieval from storage, or a network request to a service. The authorization-Needed event can fire multiple times during a single playback session, e.g., for key rotation.

The acquired content control data is provided to the media element via the authorizationData attribute. Once the data is present and correctly verified by the media stack, playout starts. In order to avoid playout delays due to latencies incurred when acquiring content control data, existing preload mechanisms can be used.

In some embodiments, the authorizationNeeded event contains an array of the following tuple: type and data, where type is an identifier of content control mechanism, and data is a byte array containing contents dependent on content control mechanism to enable application to acquire authorization data. In some embodiments, the authorizationData attribute includes a byte array in which the contents are dependent on content control mechanism, which enables the media stack to play content, and/or content data format.

In one possible embodiment of an application of the authorization data acquisition mechanism, content is encrypted using a content key, and a secure key distribution system stores the key. In some embodiments, the media stack contains client code of this secure key distribution system (though a pluggable mechanism or platform capabilities in some embodiments), and the content provider runs a key distribution service as a counterpart.

In some of these embodiments, the content control system uses: a "challenge" data structure generated on the client and a "license" data structure generated on the server using the content key and the client public key. The "challenge" data structure typically contains information about the content to be played for retrieval of the correct key, and information about the client CDM (client ID, client type, public key for encryption of the content key for transport).

In these embodiments, the media stack detects that the content is encrypted, and can be decrypted using the secure key distribution system's client CDM. The content key is acquired through a network transaction. Since the application has not yet set the authorizationData attribute of the media element to a valid "license" data structure, the media stack generates a "challenge" data structure and serializes it into a byte stream.

In these embodiments, the authorizationNeeded event gets the following two attributes: (1) type=(<string or numeric identifier for the secure key distribution system>); and (2) data=<challenge bytestream>, and fires.

In these embodiments, the application catches the event using a handler for this event. In the handler, the web application generates a request to the streaming service's license server, using an existing authentication mechanism (e.g., domain cookie) to authorize the request on the server, and the opaque data generated by the CDM. In some embodiments, the content control mechanism may choose to invalidate the authorization data after a certain number of uses, therefore disallowing replay of previously issued authorization data, and in consequence enforcing a requirement of fresh authorization for each playback.

In these embodiments, authorization depends on the streaming service's business rules. At the minimum, licenses could be handed out to everyone. In a service like this, the content still cannot be copied, and giving out rights to play back can be stopped at any time (e.g. when the service's distribution rights for this content end). Other services may require customer authentication, and even others may impose restrictions on number of devices and concurrent usage.

In these embodiments, if authorization is successful, the license server may use the content identification data in the "challenge" data structure to retrieve the content key for the content to be played from its database, and use the client key to generate a "license" data structure, which is handed back to the application in the response. The application installs the opaque license data into the authorizationData attribute of the media element, and playout starts after successful verification of the license data and extraction or derivation of the content key from the license data by the media stack. In some embodiments, the CDM is responsible for: the security of the decrypted content, the security of the content key, the security of the client CDM keys that can be used to decrypt license data, and secure disposal of the content key after playback has ended. In some embodiments, the opaque license data contains all of the necessary information to play all streams of the content in question that are authorized to the requesting user on the target device. For example, if different streams of some particular content are encrypted with different keys, the license contains all of the keys and the necessary information to associate it with the correct streams.

In some of these embodiments, the system can be extended to allow offline playback without changing the media stack implementation of the content control system, e.g. by retrieving the license from storage.

In these embodiments, a simple offline playback system allows the user to "pin" content to the client device while the device is connected. The content data (one embodiment thereof, e.g., at appropriate bitrate and quality for the target device) is downloaded from the server in its entirety and stored in local storage. The application uses a media element to initiate preload of playback for the content data in local storage, which triggers the authorization data retrieval mechanism. The authorization data is retrieved by the application as in the streaming use case, but not installed in the authorizationData attribute yet. It is cached in local storage until offline playback is initiated.

In these embodiments, if required for management of the stored authorization data, the content protection system can support the transmission of additional information on top of the opaque authorization data blob to the web application, e.g.

content ID, expiration date etc., e.g. through the network protocol that also serves to transmit the authorizationData blob. This mechanism can be proprietary to the content protection system in some embodiments.

In these embodiments, when playback is initiated, the application retrieves the authorization data from its internal storage and installs it in the media element, allowing playout to proceed.

Returning to FIG. 6, as discussed above, the event authorizationNeeded and the attribute authorizationData are instead replaced by the event needkey and the function addKey( ), respectively. Application 644 may use Get Key to acquire a key from a server, which may in turn respond with an encrypted key via Key from the server to application 644. The key may be provided from application 644 to media stack 646 via addKey( ), and from media stack 646 to CDM 649 via SetKey.

In some embodiments, canPlayType( ) is extended to provide basic information about content control systems supported by the browser.

Media stack 646 may provide an encrypted frame for CDM 649 to decrypt via Decrypt Frame. CDM 649 then decrypts the encrypted frame, and provides the decrypted frame back to media stack 646 via Frame.

In some embodiments, a generateKeyRequest( ) function may be employed from Application 644 to media stack 646. A Key Request may be sent from media stack 646 to application 644 in response to the generateKeyRequest( ) function.

The above specification, examples, and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
employing a user agent of a client to load a web application;
employing the web application to get a license for encrypted media content;
employing the web application to instruct a media stack of the user agent to play the encrypted media content;
sending the license from the web application to the media stack;
sending the license from the media stack to a content decryption module of the client, wherein the media stack and the content decryption module are distinct binaries from each other;
sending encrypted data from the media stack to the content decryption module, wherein the encrypted data includes at least a portion of the encrypted media content; and
employing the content decryption module to provide decrypted data by decrypting the encrypted data.

2. The method of claim 1, further comprising further employing the content decryption module to perform at least one of digital rights management, content protection, decoding, or de-multiplexing.

3. The method of claim 1, wherein the content decryption module is sandboxed.

4. The method of claim 1, wherein the content decryption module is pluggable.

5. The method of claim 1, wherein the content decryption module is at least one of a browser add-on or an extension.

6. The method of claim 1, wherein the content decryption module is a pluggable extension.

7. The method of claim 1, wherein the content decryption module is a browser plug-in.

8. The method of claim 1, wherein the user agent is a web browser.

9. The method of claim 1, wherein the user agent is based on at least one of HyperText Markup Language (HTML) or a markup language that is derived from HTML.

10. The method of claim 1, wherein employing the web application to get the license for the encrypted media content includes at least one of: acquiring the license from a server, retrieving the license from the web application, retrieving the license locally, or acquiring the license from a local network.

11. The method of claim 1, wherein the web application is employed to instruct the media stack to the play the media content after the web application is employed to get the license for the encrypted media content.

12. The method of claim 1, wherein employing the web application to get the license for the encrypted media content occurs after the media stack is instructed to play the media content.

13. The method of claim 1, further comprising:
sending a request for a license request from the web application to the media stack;
sending the request for the license request from the media stack to content decryption module;
in response to the content decryption module receiving the request for the license request, sending a license request from the content decryption module to the media stack;
sending the license request from the media stack to the web application, wherein employing the web application to get a license for encrypted media content is performed in response to the web application receiving the license request from the media stack.

14. The method of claim 1, wherein the web application includes at least one of a scripting language, HyperText Markup Language (HTML), or a mark-up language that is derived from HTML.

15. The method of claim 1, further comprising:
sending the decrypted data from the content decryption module to the media stack; and
employing the media stack to render the decrypted data.

16. The method of claim 15, further comprising:
employing the content decryption module to decode the encrypted data before sending the decrypted data to the media stack.

17. The method of claim 1, further comprising:
employing the content decryption module to obtain a content key after the content decryption module receives the license, wherein the decrypting the encrypted data is accomplished employing the content key.

18. The method of claim 17, wherein obtaining the content protection key is accomplished by employing the content decryption module to:
employ a secret key to decrypt the license to obtain the content key, wherein the content decryption module is further employed to protect the secret key and the content key.

19. A client device, comprising:
a memory component for storing data; and
a processing component that is configured to execute data that enables actions, including:
employing a user agent of the client device to load a web application;
employing the web application to get a license for encrypted media content;
employing the web application to instruct a media stack of the user agent to play the encrypted media content;
sending the license from the web application to the media stack;

sending the license from the media stack to a content decryption module of the client device, wherein the media stack and the content decryption module are distinct binaries from each other;

sending encrypted data from the media stack to the content decryption module, wherein the encrypted data includes at least a portion of the encrypted media content; and employing the content decryption module to provide decrypted data by decrypting the encrypted data.

20. A manufacture, including a tangible processor-readable storage medium having processor-executable code encoded therein, which when executed by one or more processors, enables actions, comprising:

employing a user agent of a client to load a web application;

employing the web application to get a license for encrypted media content;

employing the web application to instruct a media stack of the user agent to play the encrypted media content;

sending the license from the web application to the media stack;

sending the license from the media stack to a content decryption module of the client, wherein the media stack and the content decryption module are distinct binaries from each other;

sending encrypted data from the media stack to the content decryption module, wherein the encrypted data includes at least a portion of the encrypted media content; and employing the content decryption module to provide decrypted data by decrypting the encrypted data.

* * * * *